(12) United States Patent
Wang et al.

(10) Patent No.: US 7,782,432 B2
(45) Date of Patent: Aug. 24, 2010

(54) LIQUID CRYSTAL DISPLAY DEVICE HAVING A PIXEL ELECTRODE STRUCTURE AND AN ALIGNMENT LAYER CAUSING PIXEL REGIONS TO OPERATE IN BOTH TWISTED NEMATIC AND VERTICAL ALIGNMENT MODES

(75) Inventors: Chun-Jui Wang, Tainan County (TW);
I-Lin Ho, Tainan County (TW);
Tsung-Hsien Lin, Tainan County (TW);
Pei-Shan Tu, Tainan County (TW)

(73) Assignee: Chimei Innolux Corporation (TW)

( * ) Notice: Subject to any disclaimer, the term of this patent is extended or adjusted under 35 U.S.C. 154(b) by 326 days.

(21) Appl. No.: 11/974,283

(22) Filed: Oct. 12, 2007

(65) Prior Publication Data

US 2008/0094558 A1 Apr. 24, 2008

(30) Foreign Application Priority Data

Oct. 12, 2006 (TW) .............................. 95137513 A

(51) Int. Cl.
*G02F 1/1337* (2006.01)
(52) U.S. Cl. .................... 349/130; 349/129; 349/136
(58) Field of Classification Search ......... 349/129–131, 349/136
See application file for complete search history.

(56) References Cited

U.S. PATENT DOCUMENTS

| | | | |
|---|---|---|---|
| 7,215,397 B2* | 5/2007 | Inoue et al. ................. | 349/129 |
| 2003/0156237 A1* | 8/2003 | Lin et al. ..................... | 349/110 |
| 2005/0219186 A1* | 10/2005 | Kamada et al. ............... | 345/90 |
| 2008/0014372 A1* | 1/2008 | Lin et al. ..................... | 428/1.1 |

* cited by examiner

*Primary Examiner*—John Heyman
(74) *Attorney, Agent, or Firm*—Trop Pruner & Hu, P.C.

(57) ABSTRACT

A liquid crystal display device is provided that has a plurality of pixel regions where some of the pixel regions have liquid crystal molecules that operate according to both twisted nematic mode and vertical alignment mode.

21 Claims, 12 Drawing Sheets

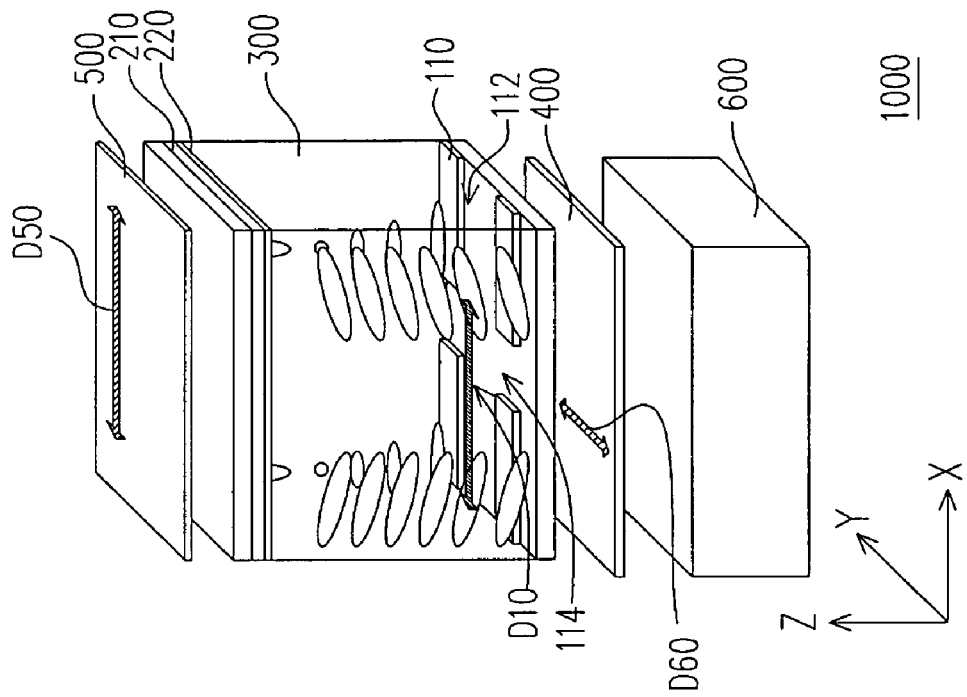
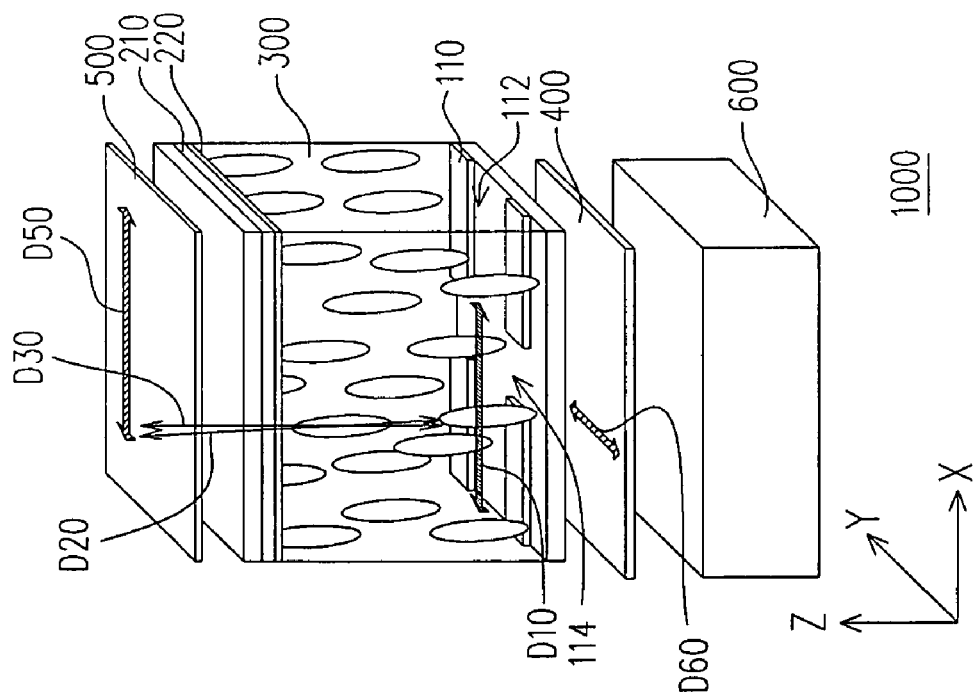

LIQUID CRYSTAL DISPLAY DEVICE HAVING A PIXEL ELECTRODE STRUCTURE AND AN ALIGNMENT LAYER CAUSING PIXEL REGIONS TO OPERATE IN BOTH TWISTED NEMATIC AND VERTICAL ALIGNMENT MODES

CROSS REFERENCE TO RELATED APPLICATION

This claims priority under 35 U.S.C. §119 of Taiwan Application No. 95137513, filed Oct. 12, 2006, which is hereby incorporated herein by reference.

TECHNICAL FIELD

This invention relates generally to a liquid crystal display device having pixel regions that operate in multiple modes.

BACKGROUND

One type of display device is the liquid crystal display (LCD) device, which has a liquid crystal layer with liquid crystal molecules capable of modulating light passing through the liquid crystal layer. One type of LCD device is the thin film transistor (TFT) LCD device.

It is generally desirable that an LCD device has high contrast, no gray scale inversion, low color shift, high luminance, high color richness, high color saturation, quick response, and wide viewing angle. LCD devices that provide a wide viewing angle usually include twisted nematic (TN) LCD devices with wide viewing films, in-plane switching (IPS) LCD devices, fringe field switching LCD devices, and multi-domain vertically alignment (MVA) TFT LCD devices.

However, in the TN LCD device, liquid crystal molecules of both upper and lower parts of the liquid crystal layer are aligned by an alignment layer, such that the manufacturing processing is made more complex. In addition, the TN LCD device has disadvantages of asymmetric viewing angle, high image luminance under dark state, and low contrast. On the other hand, VA LCD devices exhibit low light transmittance, slow speed response, and color shift.

BRIEF DESCRIPTION OF THE DRAWINGS

FIGS. 3A and 3B are partial schematic perspective views of a single pixel region in the LCD device of FIG. 1.

DETAILED DESCRIPTION

In a liquid crystal display (LCD) device of an embodiment that has array of pixel regions, the liquid crystal molecules in each of corresponding pixel regions operate according to both the TN (twisted nematic) mode and the VA (vertical alignment) mode.

Figure 1:
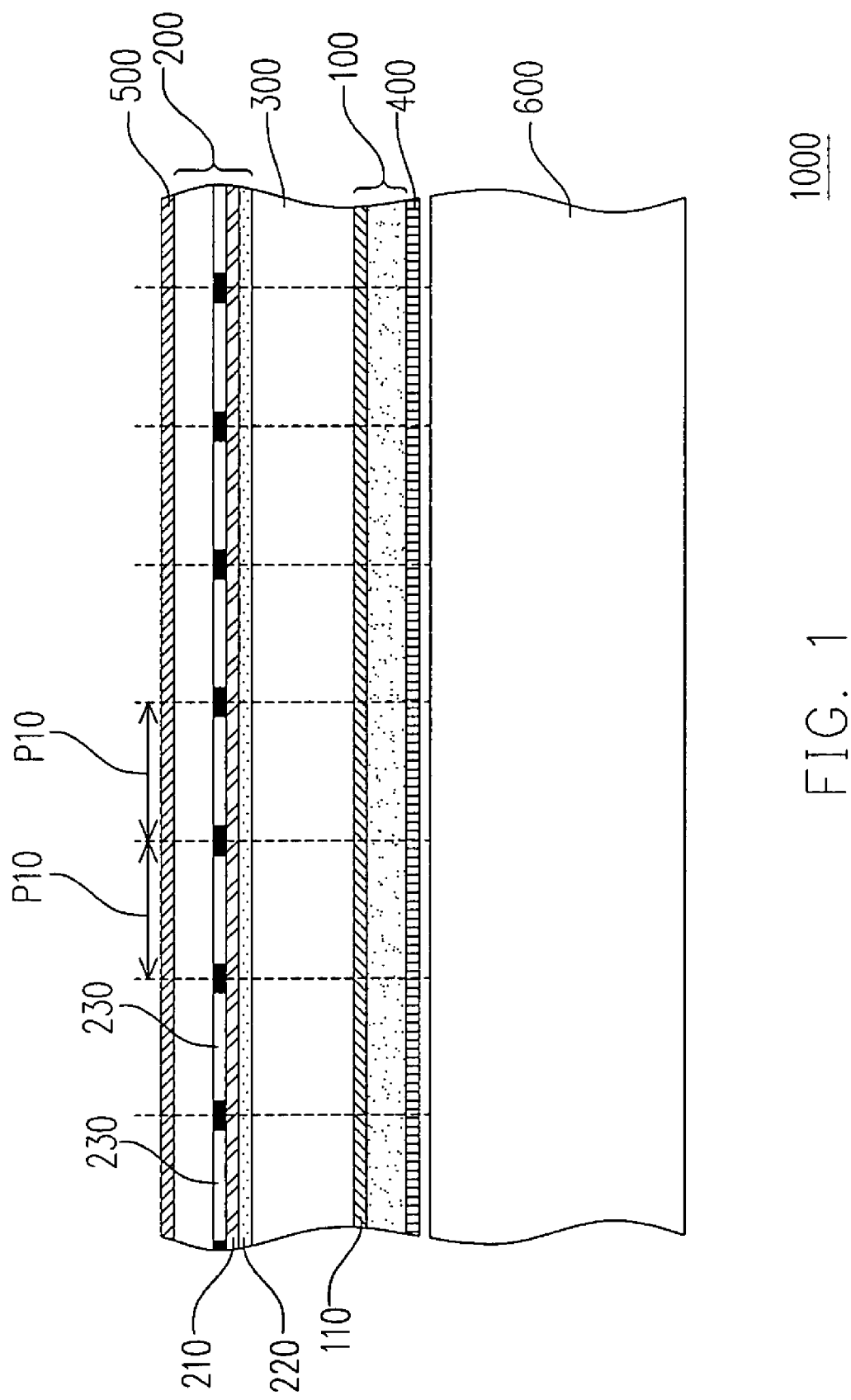
FIG. 1 is a partial cross sectional view of a liquid crystal display (LCD) device according to an embodiment.

FIG. 1 is a partial cross sectional view of an LCD device 1000 according to an embodiment. The LCD device 1000 includes a first substrate 100, a second substrate 200, and a liquid crystal layer 300 disposed between the first and second substrates 100, 200. The LCD device 1000 can be divided into a plurality (e.g., an array) of pixel regions P10. The second substrate 200 has a common electrode 210 and an alignment layer 220. The alignment layer 220 covers the common electrode 210, and is adjacent the liquid crystal layer 300.

The liquid crystal molecules of the liquid crystal layer 300 can be, for example, negative liquid crystal molecules. Negative liquid crystal molecules have negative dielectric anisotropy. The parallel dielectric constant of negative liquid crystal molecules is smaller than their vertical dielectric constant, so when an electric field is applied, the major axis of the negative liquid crystal molecules is vertical to the direction of an applied electric field.

The LCD device 1000 further includes, in one example, a first polarizer 400 and a second polarizer 500. The first polarizer 400 is disposed on a surface of the first substrate 100 away from the liquid crystal layer 300; in other words, the first polarizer 400 and the liquid crystal layer 300 are respectively disposed on two opposite surfaces of the first substrate 100. Similarly, the second polarizer 500 is disposed on a surface of the second substrate 200 away from the liquid crystal layer 300; in other words, the second polarizer 500 and the liquid crystal layer 300 are respectively disposed on two opposite surfaces of the second substrate 200.

The first substrate 100 can be an active element array substrate, which can include scan lines, data lines, active elements (e.g., thin film transistors or TFTs), pixel electrodes, and so forth. The first substrate 100 can further have a plurality of color filter films (not shown), provided in the corresponding pixel regions P10. Alternatively, instead of providing color filter films as part of the first substrate 100, the second substrate 200 can have a plurality of color filter films 230, located in corresponding pixel regions P10.

In addition, if the LCD device 1000 uses a transmissive or transflective design, the LCD device can further include a backlight module 600 to provide a surface light source that emits light through the first substrate 100, the second substrate 200, and the liquid crystal layer 300. An LCD device according to the transmissive design refers to an LCD device that uses a backlight module as a light source such that light is transmitted from the light source through the LCD panel to illuminate an image for viewing by a user. An LCD device according to the transreflective design refers to an LCD device that uses both a backlight module and light from an external source (e.g., ambient light) as light sources. Light from the external source is reflected by the LCD device to enable illumination of an image in the LCD panel.

Figure 2:
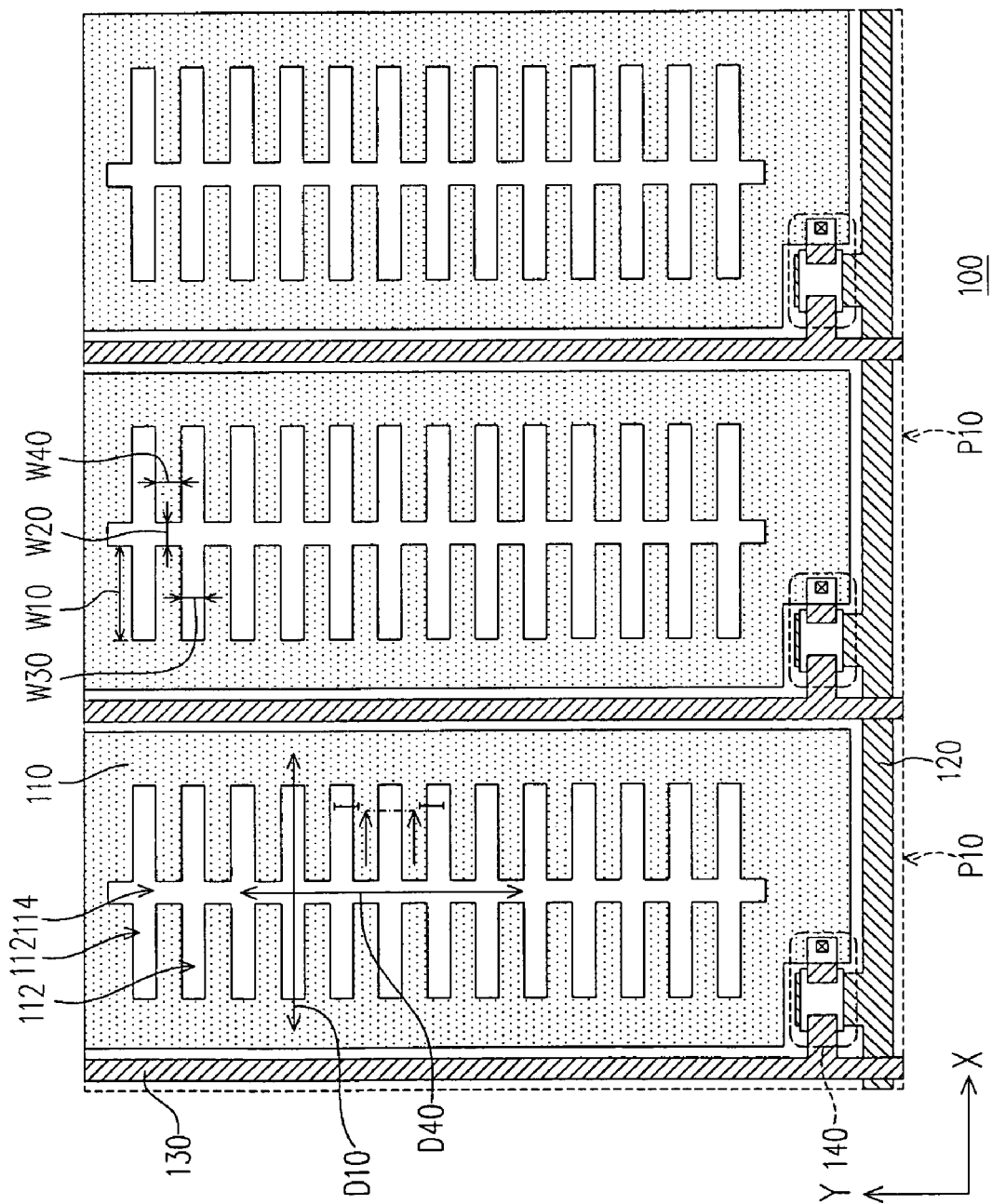
FIG. 2 is a partial top view of a first substrate in the LCD device of FIG. 1.

FIG. 2 is a partial top view of the first substrate 100 in the LCD device 1000 of FIG. 1, and FIGS. 3A and 3B are partial schematic perspective views of a single pixel region P10 in the LCD device of FIG. 1. FIG. 3A shows the state of the liquid crystal layer that is not affected by an electric field; and FIG. 3B shows the state of the liquid crystal layer that is affected by an electric field.

Referring to FIGS. 2, 3A, and 3B, the first substrate 100 has a plurality of pixel electrodes 110. Each pixel electrode 110 is located in a corresponding pixel region P10, and has a plurality of first slits 112. A "slit" is an opening in the pixel electrode 110. The first slits 112 extend generally along a first direction D10 (parallel to the X axis). The first slits 112 extend in a generally fish-bone fashion from a center slit 114 (also referred to as "second slit 114") in pixel electrode 110, which extends along a direction D40 (parallel to the Y axis) that is perpendicular to the X axis.

Note that in other implementations, other arrangements of slits can be provided.

The first substrate 100 further has, for example, a plurality of scan lines 120 (only one scan line is shown in FIG. 2), a plurality of data lines 130, and a plurality of active elements 140 (which can be TFTs). The pixel regions P10 are defined by the scan lines 120 and the data lines 130. The active elements 140 are electrically connected to the corresponding scan lines 120, the data lines 130, and the pixel electrodes 110. The active elements 140 are driven by the corresponding scan lines 120, and the pixel electrodes 110 receive the signals transmitted over the corresponding data lines 130 via the active elements 140. For example, active elements 140 that are TFTs can be turned on and off by corresponding scan lines (which are connected to gates of the TFTs). A signal in a data line can be passed through a TFT that is turned on to the corresponding pixel electrode. Note that the voltage supplied to the pixel electrode 110 causes an electric field to be developed between the pixel electrode 110 and the common electrode 210 through the liquid crystal layer 300 (see FIG. 1).

The liquid crystal layer 300 is disposed between the first substrate 100 (FIG. 1) and the alignment layer 220 (FIGS. 1, 3A) of the second substrate 200, and the pixel electrodes 110 are located on the surface of the first substrate 100 facing the liquid crystal layer 300. Note that an alignment layer (not shown) can also be disposed on the pixel electrode of the first substrate 100. Liquid crystal molecules in the liquid crystal layer 300 are aligned by the alignment layers of the first and second substrates. When the liquid crystal molecules of the liquid crystal layer 300 are not affected by an electric field, the liquid crystal molecules are substantially vertically arranged, as shown in FIG. 3A. The alignment layer 220 pre-tilts the liquid crystal molecules of the liquid crystal layer 300 along a second direction D20; in other words, the major axis of the liquid crystal molecules of the liquid crystal layer 300 is parallel to the second direction D20. The first direction D10 (as shown in FIG. 2) is substantially perpendicular to the second direction D20. The projection of the major axis of the liquid crystal molecules of the liquid crystal layer 300 on the X-Y plane is parallel to the Y axis. Note that the X-Y plane is the plane generally parallel to the surface of the first substrate 100, as depicted in FIGS. 2, 3A, and 3B.

An included angle formed between the major axis (parallel to the second direction D20) of the liquid crystal molecules of the liquid crystal layer 300 that are closer to the alignment layer 220 and a normal direction D30 (parallel to the Z axis in FIG. 3A) can be in a range of 0-15 degrees. In other implementations, the included angle can have other values. Pre-tilting the liquid crystal molecules of the liquid crystal layer 300 along the second direction D20 is performed to allow all the liquid crystal molecules to be tilted towards generally the same direction once the liquid crystal molecules are subjected to an electric field.

To fabricate the alignment layer 220, a brush is used to rub the alignment film 220 along a direction (e.g., Y axis) perpendicular to the first direction D10, so as to form grooves on the alignment film 220 capable of pre-tilting the liquid crystal molecules. Alternatively, a photo-alignment process can be used to achieve the alignment effect on the molecular structure of the alignment film 220. In this implementation, the alignment angle of the liquid crystal molecules is determined depending upon the incident angle of the light rays for alignment.

As noted above, each pixel electrode 110 further has the second (center) slit 114 connected to each first slit 112. The second slit 114 extends generally along a center line (direction D40) of the pixel electrode, with each first slit 112 extending generally perpendicularly with respect to the second slit 114 along the first direction D10. Note that different arrangements of the slits 112, 114 can be used in other implementations.

In the illustrated embodiment, the alignment layer 220 is aligned along a direction parallel to the extending direction D40 of the second slit 114, such that the liquid crystal molecules of the liquid crystal layer 300 are pre-tilted along the second direction D20.

As depicted in FIG. 2, a distance W10 along the X axis is provided between an end of each first slit 112 and the second slit 114, which can be, for example, 10-35 µm. In other words, the length of each first slit 112 is W10. Also, the second slit 114 has a width W20 along the X axis, and each first slit 112 has a width W30 along the Y axis. Adjacent slits 112 are spaced apart by a distance W40 along the Y axis, which can be, for example, 1-6 µm. Note that the pixel electrode 110 having the first slits 112 and the second slit 114 is used as an example for illustration in this embodiment. Note that similar first and second slits can also or alternatively be provided on the common electrode 210.

If provided, the first polarizer 400 and the second polarizer 500 can be linear polarizers. A polarizing direction D60 (FIGS. 3A-3B) of the first polarizer 400 and a polarizing direction D50 of the second polarizer 500 are, for example, substantially perpendicular to each other. As shown in FIG. 3A, when the liquid crystal molecules of the liquid crystal layer 300 in this embodiment are not affected by the electric field, they are arranged generally vertically with respect to the first polarizer 400, so that the polarizing direction of the light rays passing through the first polarizer 400 is not changed by the liquid crystal layer 300, and the light rays cannot pass through the second polarizer 500. In other words, the pixel region in FIG. 3A is in a dark state. As shown in FIG. 3B, when the liquid crystal molecules of the liquid crystal layer 300 rotate due to the effect of an applied electric field, the polarizing direction of the light rays passing through the first polarizer 400 is changed by the liquid crystal layer 300, and the light rays can pass through the second polarizer 500. In other words, the pixel region in FIG. 3B is in a white state. In addition, the polarizing direction D50 of the light rays passing through the second polarizer 500 is, for example, substantially perpendicular to the first direction D10 (along which the first slits 112 extend); in other words, the polarizing direction D50 is parallel to the Y axis. However, in other implementations, other polarizing directions can be used.

Figure 4A:
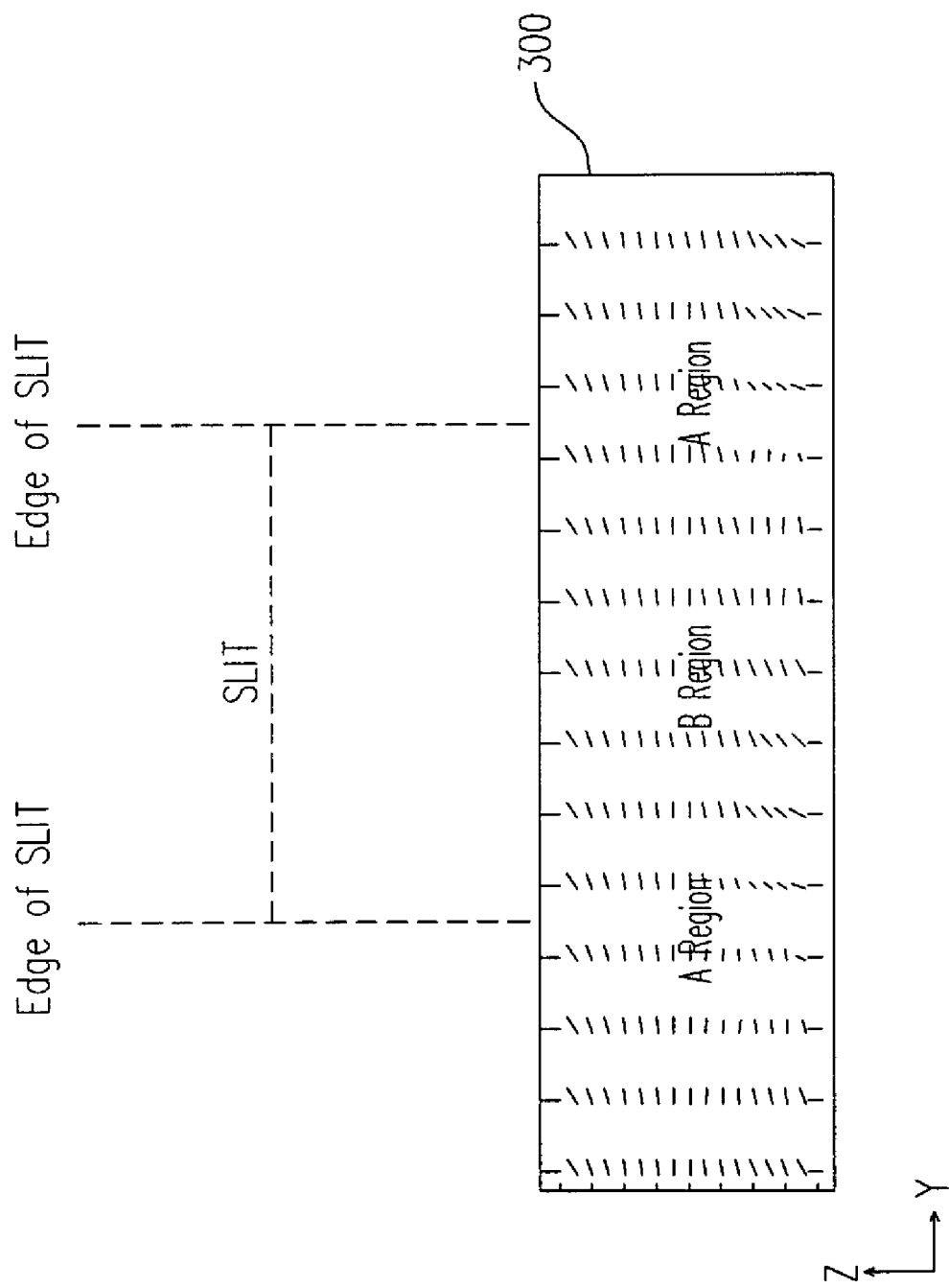
FIG. 4A is a partial cross sectional view of the liquid crystal layer in the liquid crystal display of FIG. 3B in the Y-Z plane, taken along a section line I-I as shown in FIG. 2.

FIG. 4A is a partial cross sectional view of the liquid crystal layer 300 in the pixel region of FIG. 3B on the Y-Z plane, taken along a section line I-I as shown in FIG. 2. FIG. 4A shows an example simulated arrangement of liquid crystal molecules. Referring to FIGS. 3B and 4A, when the liquid crystal layer 300 is affected by an applied electric field, the liquid crystal molecules at the edges (A regions) of the first slit 112 are affected by electric field portions in two directions: first electric field portions between the common electrode 210 and the pixel electrode 110 in regions away from first slits 112, and second electric field portions between the pixel electrode 110 and the common electrode 210 in regions near edges of the first slits 112. The electric field portions are illustrated in an example arrangement of FIG. 4B, where electric field portions 420 are the first electric field portions away from a first slit 112, and electric field portions 430 are the second electric field portions at or near the edges of the first slit 112, which are bent due to fringe field effect of the first slit 112.

Figure 4B:
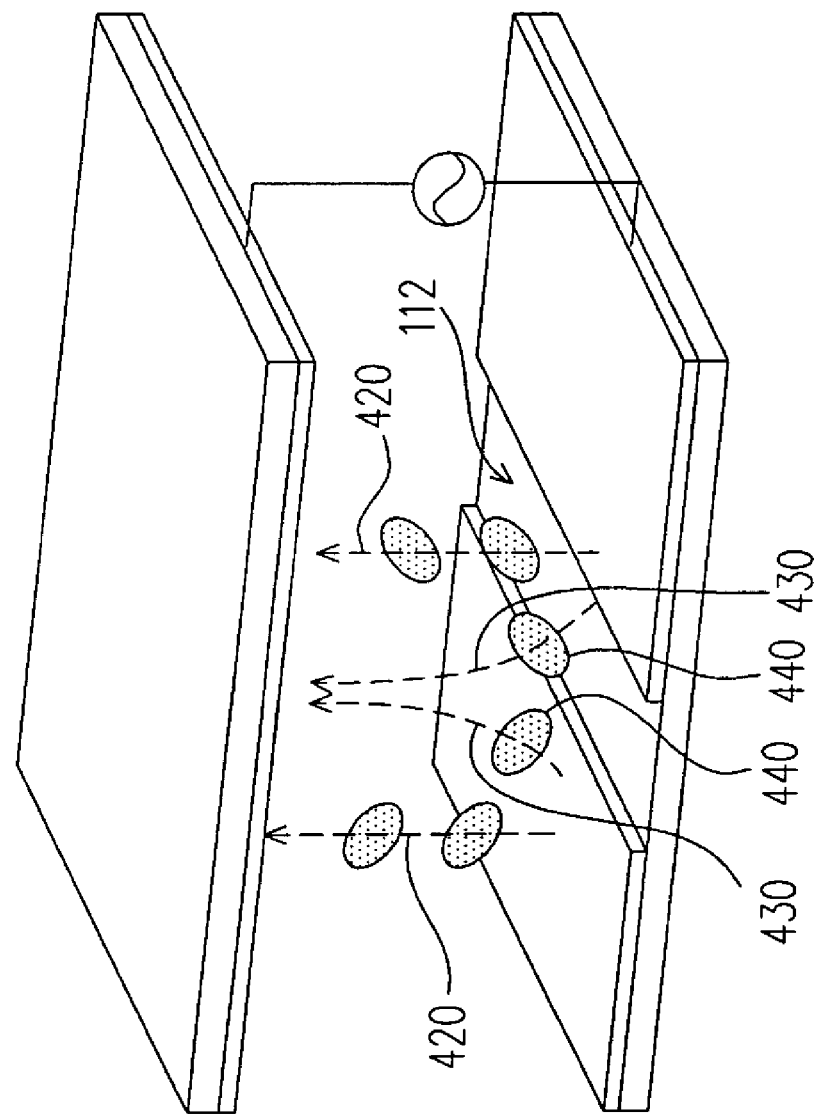
FIG. 4B illustrates electric field portions between a pixel electrode and a common electrode in the presence of a slit in the pixel electrode.
Figure 4C:
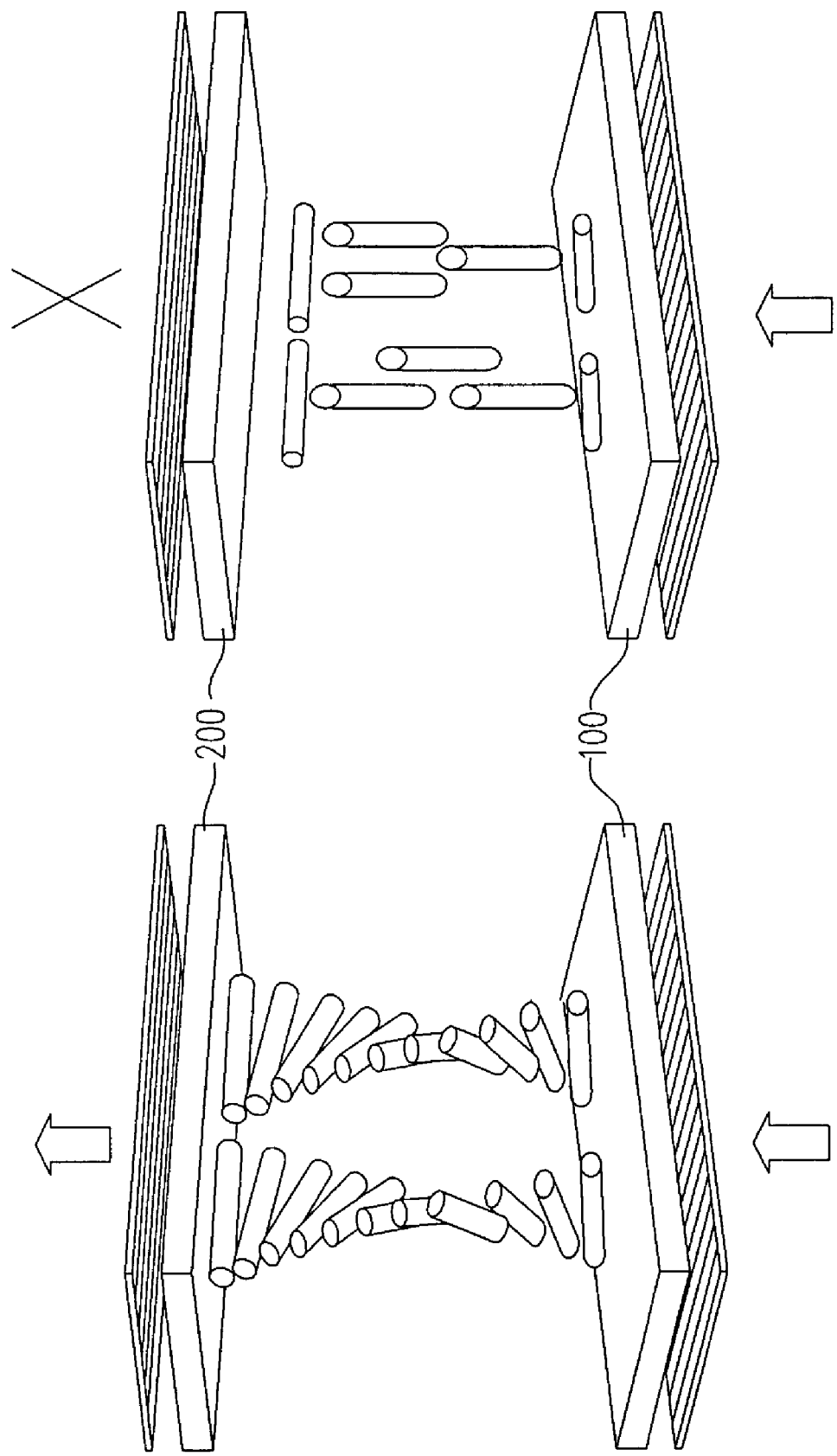
FIG. 4C illustrates liquid crystal molecules exhibiting a twisted nematic (TN) mode of operation.

The liquid crystal molecules of the liquid crystal layer closer to the common electrode 210 are mainly affected by the electric field between the common electrode 210 and the pixel electrode 110 and the alignment effect of the alignment layer. The major axis of the liquid crystal molecules at the edges of the first slits 112 is substantially parallel to the X axis, and the major axis of the liquid crystal molecules at the common electrode 210 is substantially parallel to the Y axis, as shown by Region A in FIG. 4A. Therefore, in Region A corresponding to the edges of the first slits 112, the operation mode of the liquid crystal molecules is in the TN mode. FIG. 4C shows an example arrangement of liquid molecules that exhibit the twist behavior of liquid crystal molecules positioned in Region A at various depths between the first substrate 100 (where pixel electrode 110 is located) and the second substrate 200 (where the common electrode 210 is located). Such behavior is consistent with the TN mode of operation.

Referring to FIGS. 3B and 4A, when the liquid crystal layer 300 is affected by the electric field and alignment layer, due to the squeezing of the liquid crystal molecules at the edges of the first slits 112, the liquid crystal molecules in the middle part of the first slits 112 and in the regions of the pixel electrode 110 between the first slits 112 and away from the slit edges (i.e., liquid crystal molecules corresponding to Region B in FIG. 4A) are operated in the VA mode. As illustrated in the example of FIG. 4B, liquid crystal molecules 440 in the middle part of the first slit 112 are pushed (squeezed) by liquid crystal molecules at the edges of the slit 112 toward the center of the slit 112.

Figure 4D:
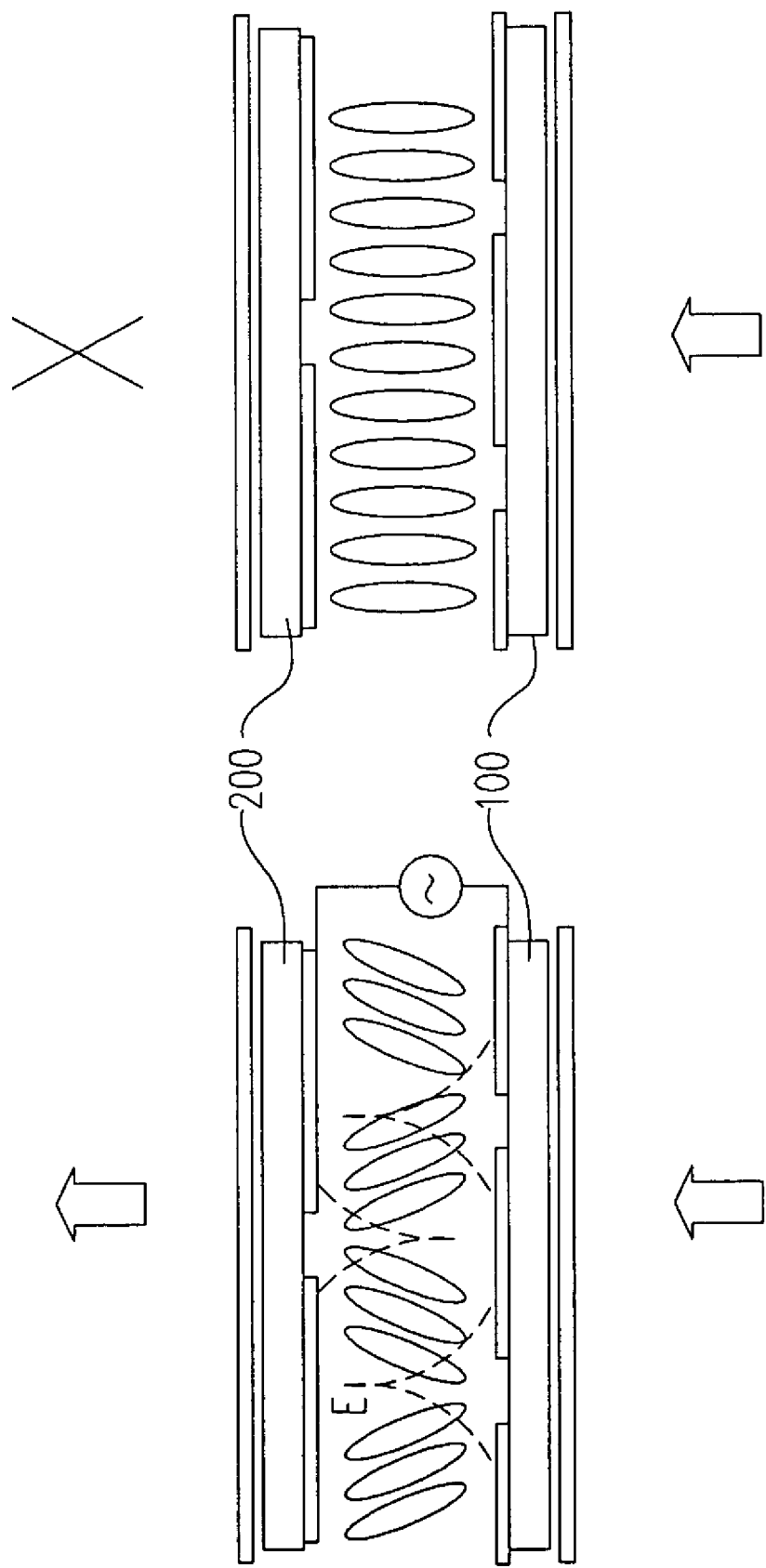
FIG. 4D illustrates liquid crystal molecules exhibiting a vertical alignment (VA) mode of operation.

FIG. 4D shows behaviors of liquid crystal molecules in Region B—such liquid crystal molecules exhibit the VA mode of operation.

Figure 6:
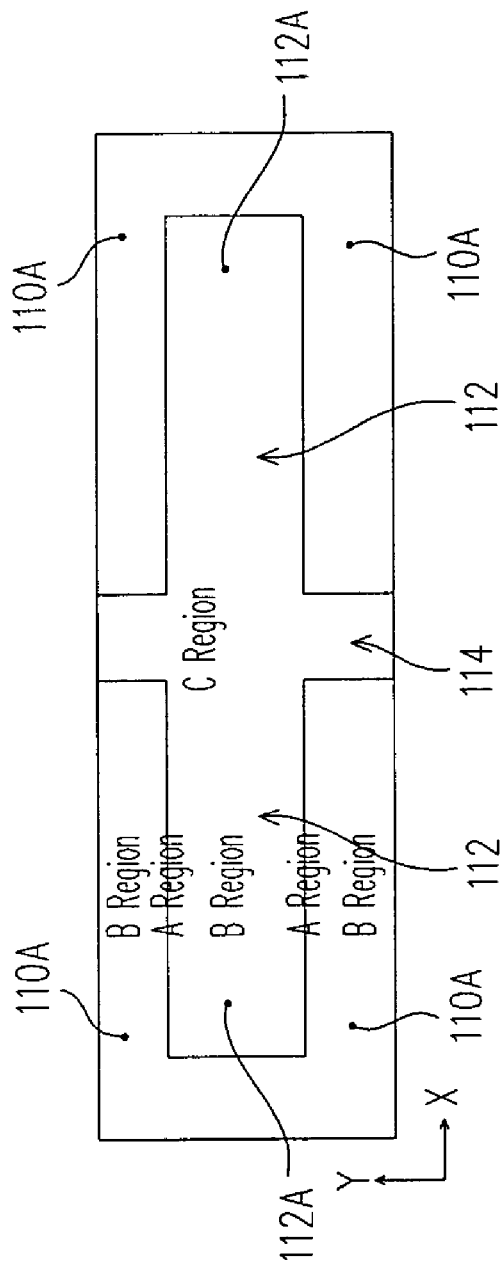
FIG. 6 illustrates slits in a pixel electrode.
Figure 5A:
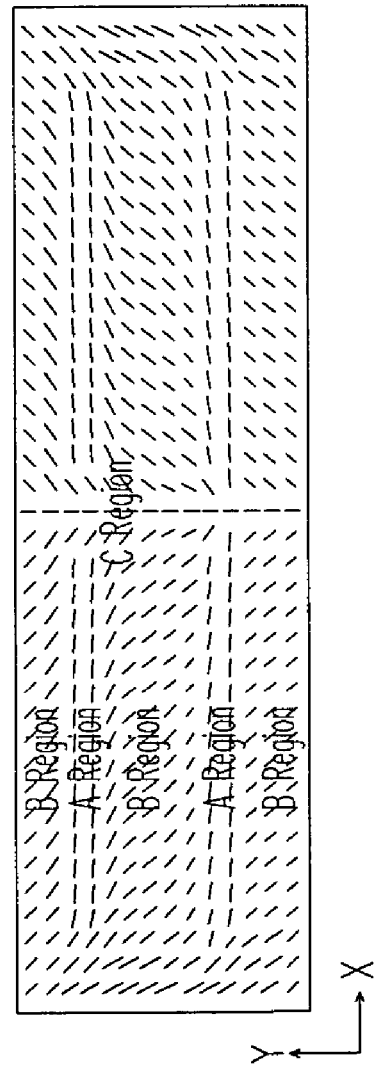
FIGS. 5A to 5E are partial cross sectional views of the liquid crystal layer in the liquid crystal display of FIG. 3B at positions of 0.5, 1, 2, 3, and 3.5 μm away from the first substrate.
Figure 5B:
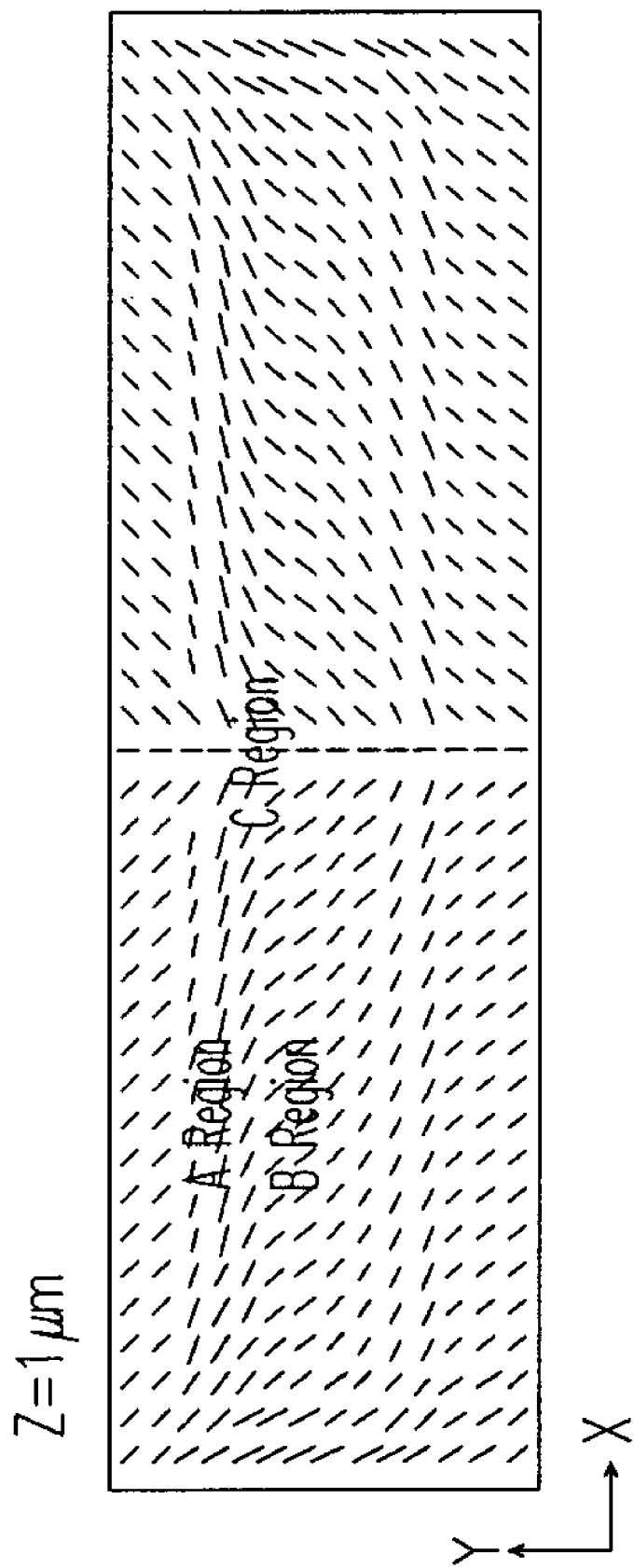
Figure 5C:
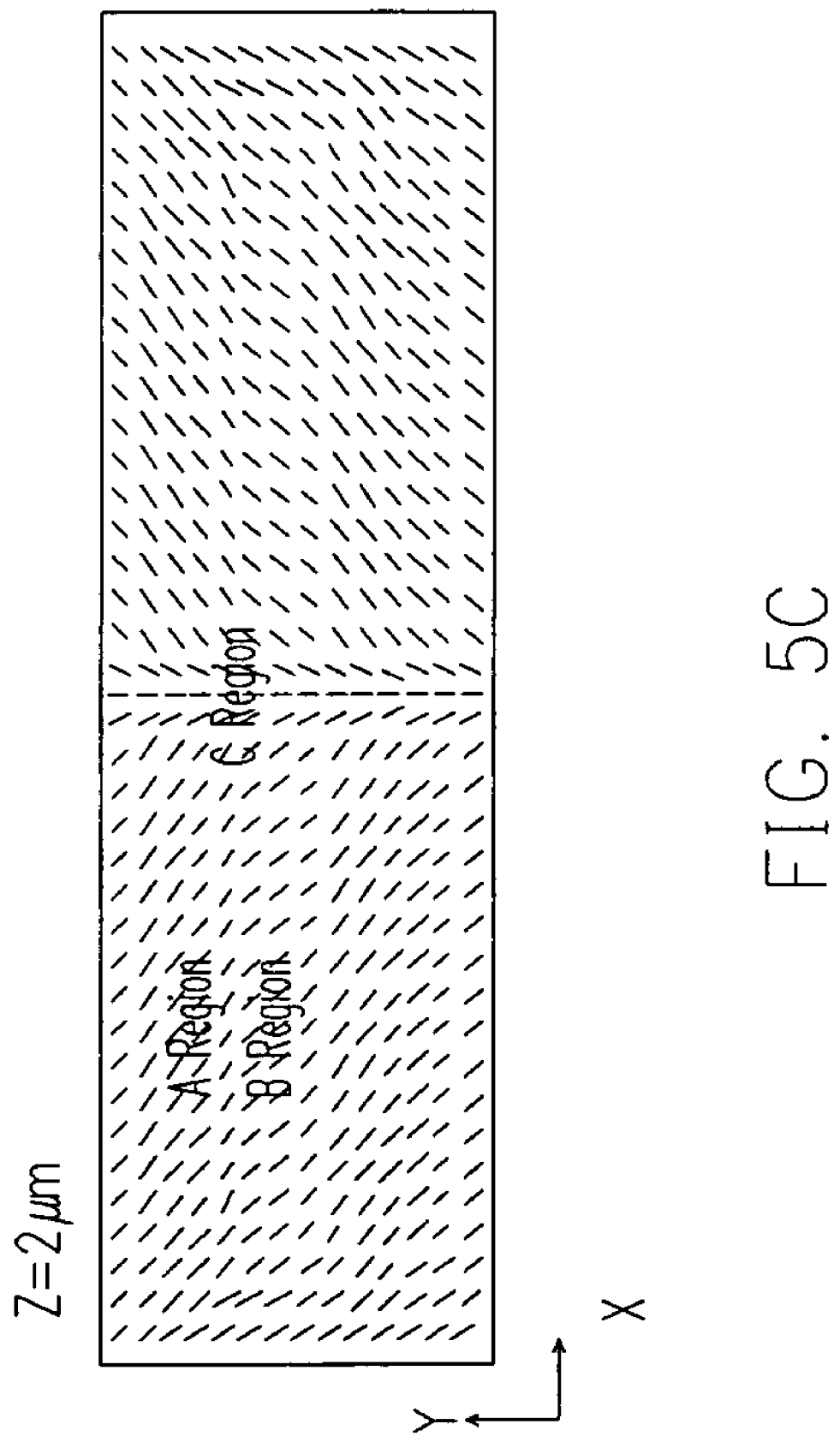
Figure 5D:
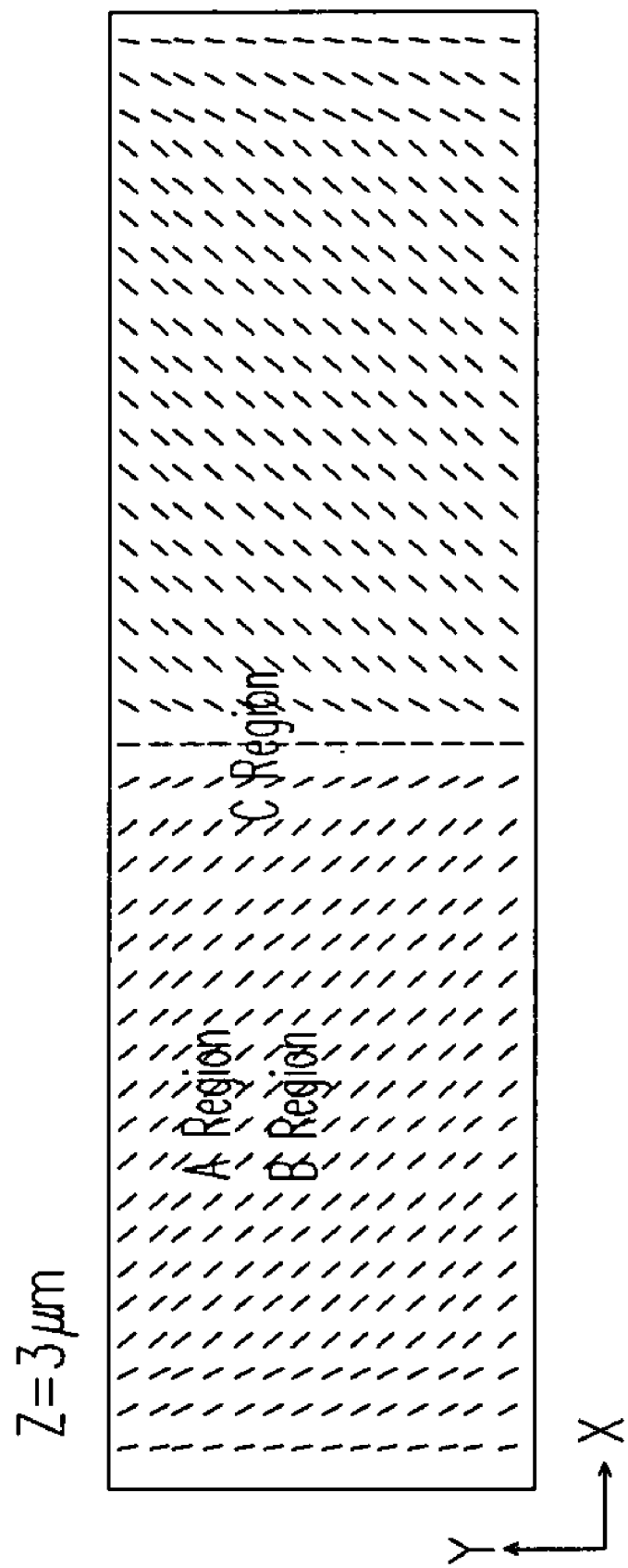
Figure 5E:
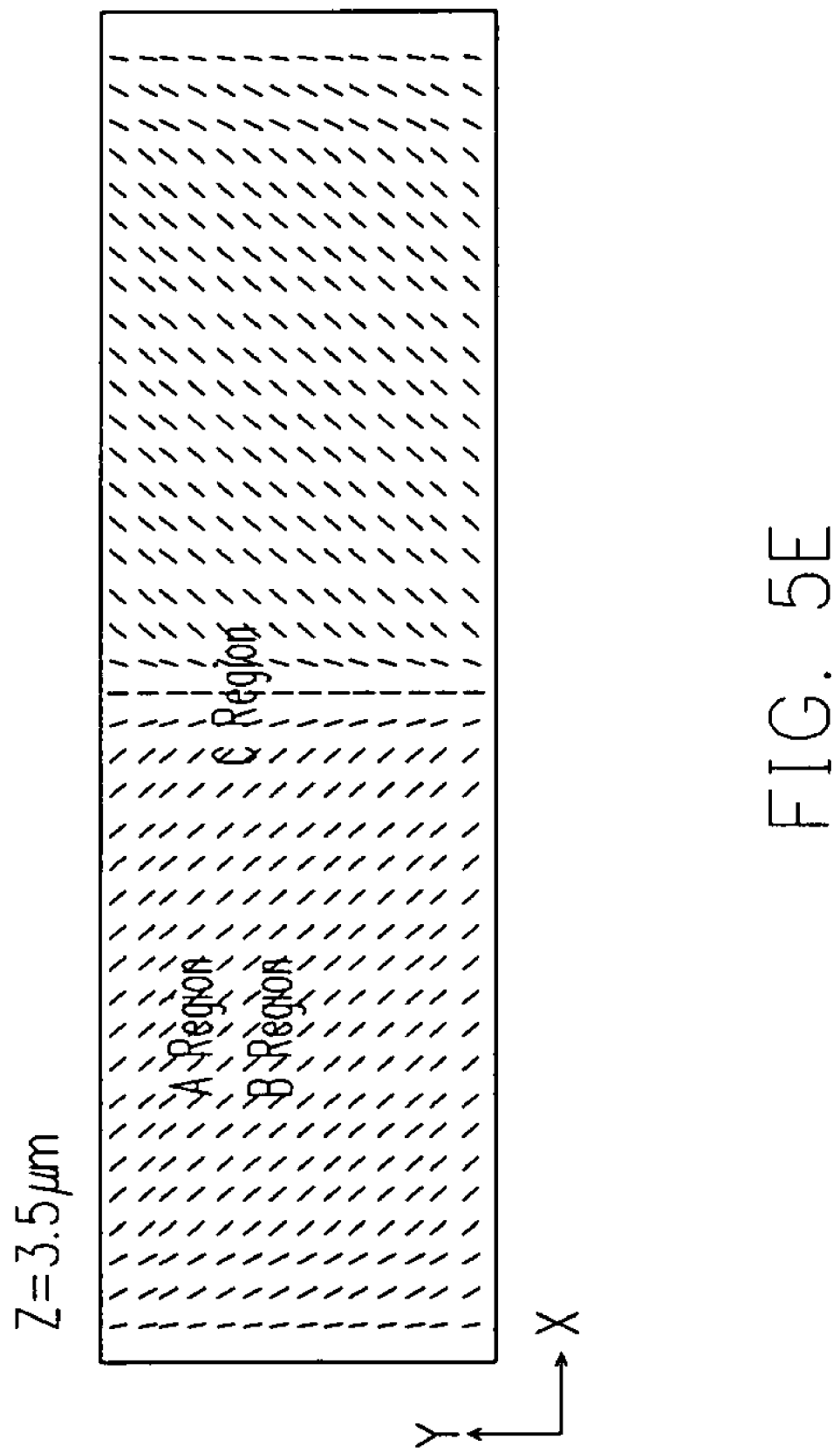

According to one example, it is assumed that a thickness of the liquid crystal layer 300 is 4 μm. FIGS. 5A to 5E are partial cross sectional views of the projection of the major axis of the liquid crystal molecules, in the X-Y plane in sequence, of the liquid crystal layer in the pixel region P10 of FIG. 3B at positions of 0.5, 1, 2, 3, and 3.5 μm, respectively, away from the first substrate 100. The orientations of the liquid crystal molecules are simulated in the example views. Region A and Region B in FIGS. 5A to 5E respectively corresponding to Region A and Region B in FIG. 4. FIG. 6 is provided next to FIG. 5A to show where the slits 112 and 114 are positioned in relation to the liquid crystal molecules of FIG. 5A. Referring to FIGS. 3B and 5A, when the liquid crystal layer 300 is affected by an applied electric field, the projection of the major axis of the liquid crystal molecules in Region A corresponding to the edges of the first slit 112 in the X-Y plane is approximately parallel to the X axis, and the projection of the major axis of the liquid crystal molecules in Region B corresponding to the middle part 112A (FIG. 6) of the first slit 112 and in the regions 110A corresponding to the pixel electrode 110 between the first slits 112 forms an angle of approximately 45 degrees with the X axis. Referring to FIGS. 3B and 5B to 5E, when the liquid crystal layer 300 is affected by an applied electric field, the projection of the major axis of the liquid crystal molecules in Region A on the X-Y plane gradually rotates towards the direction parallel to the Y axis (this behavior is also depicted in FIG. 4C), and the projection of the major axis of the liquid crystal molecules in Region B on the X-Y plane still forms an angle of approximately 45 degrees with the X axis.

Referring again to FIGS. 3B and 5A, when the liquid crystal layer 300 is affected by an applied electric field, the projection of the major axis of the liquid crystal molecules in Region A on the X-Y plane is mostly approaching the direction parallel to the X axis, and the projection of the major axis of the liquid crystal molecules in Region B on the X-Y plane still forms an angle of approximately 45 degrees with the X axis. Thus, according to FIGS. 5A to 5E, it can be observed that the operation mode of the liquid crystal molecules of Region A is the TN mode, and the operation mode of the liquid crystal molecules of Region B is the VA mode. Therefore, in each single pixel region P10, the LCD device 1000 has liquid crystal molecules that operate both in the TN mode and in the VA mode in different parts of the pixel region P10.

In addition, referring to FIGS. 5A to 5E, the arrangement of the liquid crystal molecules in the right part of the drawing is approximately symmetric to (mirrors) the arrangement of the liquid crystal molecules in the left part of the drawing. Region C in the center of the drawing corresponds to the second slit 114 of FIG. 3B. The liquid crystal molecules at the two edges of the center slit 114 are affected by the electric field generated by the pixel electrodes 110 at the edges, which directs the liquid crystal molecules at two edges of Region C towards different directions. Thus, in each pixel region P10 according to the depicted, the liquid crystal molecules in a single pixel region P10 operate according to modes of two domains.

Thus, according to some embodiments, an LCD device has pixel regions that each operate in both the TN mode and the VA mode, so that the LCD device can exhibit low image luminance under dark state, high contrast, high light transmittance, quick response, smaller color shift, and so forth. In addition, through the design of the second slit (center slit), the LCD device can have the benefit that the viewing angle is relatively symmetric.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display (LCD) device, comprising:
a plurality of pixel regions;
a first substrate having a plurality of pixel electrodes, wherein each pixel electrode is respectively located in one of the pixel regions, each pixel electrode having a plurality of first slits extending along a first direction and a second slit connected to the first slits, wherein the second slit of each pixel electrode extends in a direction that is substantially perpendicular to the first direction;
a second substrate having a common electrode and an alignment layer, wherein the alignment layer covers the common electrode, wherein the alignment layer is rubbed along a direction perpendicular to the first direction; and
a liquid crystal layer, disposed between the pixel electrodes of the first substrate and the alignment layer of the second substrate, wherein liquid crystal molecules of the liquid crystal layer are aligned by the alignment layer by pre-tilting the liquid crystal molecules along a second direction, the second direction being substantially per- pendicular to the first direction, wherein the liquid crystal molecules of each pixel region are negative liquid crystal molecules, wherein an arrangement of the first slits and the second slits in the corresponding pixel electrodes and the alignment layer is to cause each of multiple ones of the pixel regions to have liquid crystal molecules that operate according to both a twisted nematic (TN) mode and a vertical alignment (VA) mode.

2. The LCD device of claim 1, wherein each of the multiple pixel regions has a first region and a second region, the liquid crystal molecules in the first region operating according to the TN mode, and the liquid crystal molecules in the second region operating according to the VA mode.

3. The LCD device of claim 1, wherein an included angle formed between a major axis of the liquid crystal molecules of the liquid crystal layer close to the alignment layer and a normal direction of the second substrate is in a range of 0°-15°.

4. The LCD device of claim 1, wherein a width of the second slit, a width of each first slit, and a distance between any two neighboring first slits are in a range of 1-6 μm.

5. The LCD device of claim 1, wherein each second slit extends along a center line of the corresponding pixel electrode.

6. The LCD device of claim 1, further comprising a first polarizer and a second polarizer, respectively disposed on surfaces of the first substrate and the second substrate away from the liquid crystal layer, wherein polarizing directions of the first polarizer and the second polarizer are substantially perpendicular to each other.

7. The LCD device of claim 1, wherein the first substrate is an active element array substrate.

8. The LCD device of claim 7, wherein the first substrate further has a plurality of color filters located in respective pixel regions.

9. The LCD device of claim 1, wherein the second substrate further has a plurality of color filters located in respective pixel regions.

10. The LCD device of claim 1, further comprising a backlight module, wherein the first substrate, the second substrate, and the liquid crystal layer are disposed to receive light from the backlight module.

11. The LCD device of claim 1, wherein at regions corresponding to edges of the first slits, an operation mode of the liquid crystal molecules is in the TN mode.

12. The LCD device of claim 1, wherein at a region corresponding to a middle part of each first slit and at a region of each of the pixel electrodes between the first slits and away from the edges of the first slits, an operation mode of the liquid crystal molecules is in the VA mode.

13. The LCD device of claim 1, wherein each of the multiple pixel regions has the liquid crystal molecules that operate according to the TN mode and the liquid crystal molecules that operate according to the VA mode when the corresponding pixel region is activated by application of an electric field.

14. A liquid crystal display (LCD) device, comprising:
a plurality of pixel regions;
a first substrate having a plurality of pixel electrodes, where each pixel electrode is respectively located in one of the pixel regions, each pixel electrode having a plurality of first slits extending along a first direction and a second slit connected to the first slits, wherein in each pixel electrode the first slits extend in a generally fish-bone fashion from the corresponding second slit;
a second substrate having a common electrode and an alignment layer, wherein the alignment layer covers the common electrode; and
a liquid crystal layer disposed between the pixel electrodes of the first substrate and the alignment layer of the second substrate, wherein liquid crystal molecules of the liquid crystal layer are aligned by the alignment layer by pre-tilting the liquid crystal molecules along a second direction, the second direction being substantially perpendicular to the first direction, wherein an arrangement of the first slits and the second slits in the corresponding pixel electrodes and the alignment layer is to cause each of multiple ones of the plurality of pixel regions to have liquid crystal molecules that operate according to a twisted nematic (TN) mode and liquid crystal molecules that operate according to a vertical alignment (VA) mode.

15. The LCD device of claim 14, wherein a distance from an end of each first slit to the corresponding second slit is in a range of 10-35 μm.

16. The LCD device of claim 14, wherein the liquid crystal molecules of each pixel region are negative liquid crystal molecules.

17. The LCD device of claim 14, wherein each of the multiple pixel regions has the liquid crystal molecules that operate according to the TN mode and the liquid crystal molecules that operate according to the VA mode when the corresponding pixel region is activated by application of an electric field.

18. A method of providing a liquid crystal display, comprising:
providing plural pixel regions;
providing a first substrate having a plurality of pixel electrodes, wherein each pixel electrode is respectively located in one of the pixel regions, each pixel electrode having a plurality of first slits extending along a first direction and a second slit connected to the first slits, wherein the second slit of each pixel electrode extends in a direction that is substantially perpendicular to the first direction;
providing a second substrate having a common electrode and an alignment layer, wherein the alignment layer covers the common electrode, wherein the alignment layer is rubbed along a direction perpendicular to the first direction; and
disposing a liquid crystal layer between the pixel electrodes of the first substrate and the alignment layer of the second substrate, wherein liquid crystal molecules of the liquid crystal layer are aligned by the alignment layer by pre-tilting the liquid crystal molecules along a second direction, the second direction being substantially perpendicular with the first direction, wherein the liquid crystal molecules of each pixel region are negative liquid crystal molecules, wherein an arrangement of the first slits and the second slits in the corresponding pixel electrodes and the alignment layer causes each of multiple ones of the plural pixel regions to have liquid crystal molecules that operate according to a twisted nematic mode and liquid crystal molecules that operate according to a vertical alignment mode.

19. The method of claim 18, wherein each of the multiple pixel regions has the liquid crystal molecules that operate according to the TN mode and the liquid crystal molecules that operate according to the VA mode when the corresponding pixel region is activated by application of an electric field.

20. A method of providing a liquid crystal display, comprising:

providing a plurality of pixel regions;

providing a first substrate having a plurality of pixel electrodes, where each pixel electrode is respectively located in one of the pixel regions, each pixel electrode having a plurality of first slits extending along a first direction and a second slit connected to the first slits, wherein in each pixel electrode the first slits extend in a generally fish-bone fashion from the corresponding second slit;

providing a second substrate having a common electrode and an alignment layer, wherein the alignment layer covers the common electrode; and disposing a liquid crystal layer between the pixel electrodes of the first substrate and the alignment layer of the second substrate, wherein liquid crystal molecules of the liquid crystal layer are aligned by the alignment layer by pre-tilting the liquid crystal molecules along a second direction, the second direction being substantially perpendicular to the first direction, wherein an arrangement of the first slits and the second slits in the corresponding pixel electrodes and the alignment layer is to cause each of multiple ones of the plurality of pixel regions to have liquid crystal molecules that operate according to a twisted nematic (TN) mode and liquid crystal molecules that operate according to a vertical alignment (VA) mode.

21. The method of claim 20, wherein each of the multiple pixel regions has the liquid crystal molecules that operate according to the TN mode and the liquid crystal molecules that operate according to the VA mode when the corresponding pixel region is activated by application of an electric field.

* * * * *